US005640172A

United States Patent [19]

Kim

[11] Patent Number: 5,640,172
[45] Date of Patent: Jun. 17, 1997

[54] ON-SCREEN DISPLAY CIRCUIT

[75] Inventor: Ho Hyun Kim, Daeku, Rep. of Korea

[73] Assignee: Goldstar Electron Co., Ltd., Choongchungbook-Do, Rep. of Korea

[21] Appl. No.: 368,638

[22] Filed: Jan. 4, 1995

[30] Foreign Application Priority Data

Feb. 16, 1994 [KR] Rep. of Korea ............... 2716/1994

[51] Int. Cl.$^6$ ............................................. H04N 5/445
[52] U.S. Cl. ............................ 345/26; 348/468; 348/569
[58] Field of Search ........................... 345/25, 26, 56, 345/121, 123, 124, 194, 213; 348/468, 569, 511, 589, 600, 564, 571, 714; H04N 5/445, 5/272, 5/278

[56] References Cited

U.S. PATENT DOCUMENTS

| 4,821,102 | 4/1989 | Ichikawa et al. | 348/511 |
|---|---|---|---|
| 5,486,842 | 1/1996 | Kim | 345/26 |
| 5,500,680 | 3/1996 | Lee | 348/468 |

*Primary Examiner*—Richard Hjerpe
*Assistant Examiner*—Kara Farnandez Stoll

[57] ABSTRACT

An on-screen display circuit comprising a moving clock generator for generating a moving clock signal and a character moving clock signal in response to a vertical synchronous signal, the moving clock signal varying a horizontal display position value, the character moving clock signal indicating that information to be displayed on a screen has been moved by a horizontal width of one character, a horizontal position detector for generating a horizontal position signal in response to the moving clock signal and the character moving clock signal from the moving clock generator, a vertical position signal and vertical and horizontal clock signals and outputting the generated horizontal position signal to a horizontal dot clock generator, the horizontal position signal designating a horizontal position of a character to be displayed on the screen, a display off signal generator for generating a display off signal in response to the vertical and horizontal clock signals, and a RAM address generator for generating a read address in response to the character moving clock signal from the moving clock generator, the vertical clock signal and a horizontal dot clock signal from the horizontal dot clock generator so that the character to be displayed can appear on the screen, being moved to the desired position.

5 Claims, 5 Drawing Sheets

ON-SCREEN DISPLAY CIRCUIT

BACKGROUND OF THE INVENTION

1. Field of the Invention

The present invention relates in general to on-screen display circuits, and more particularly to an on-screen display circuit for displaying characters or pictures successively like motion captions.

2. Description of the Prior Art

Figure 1:
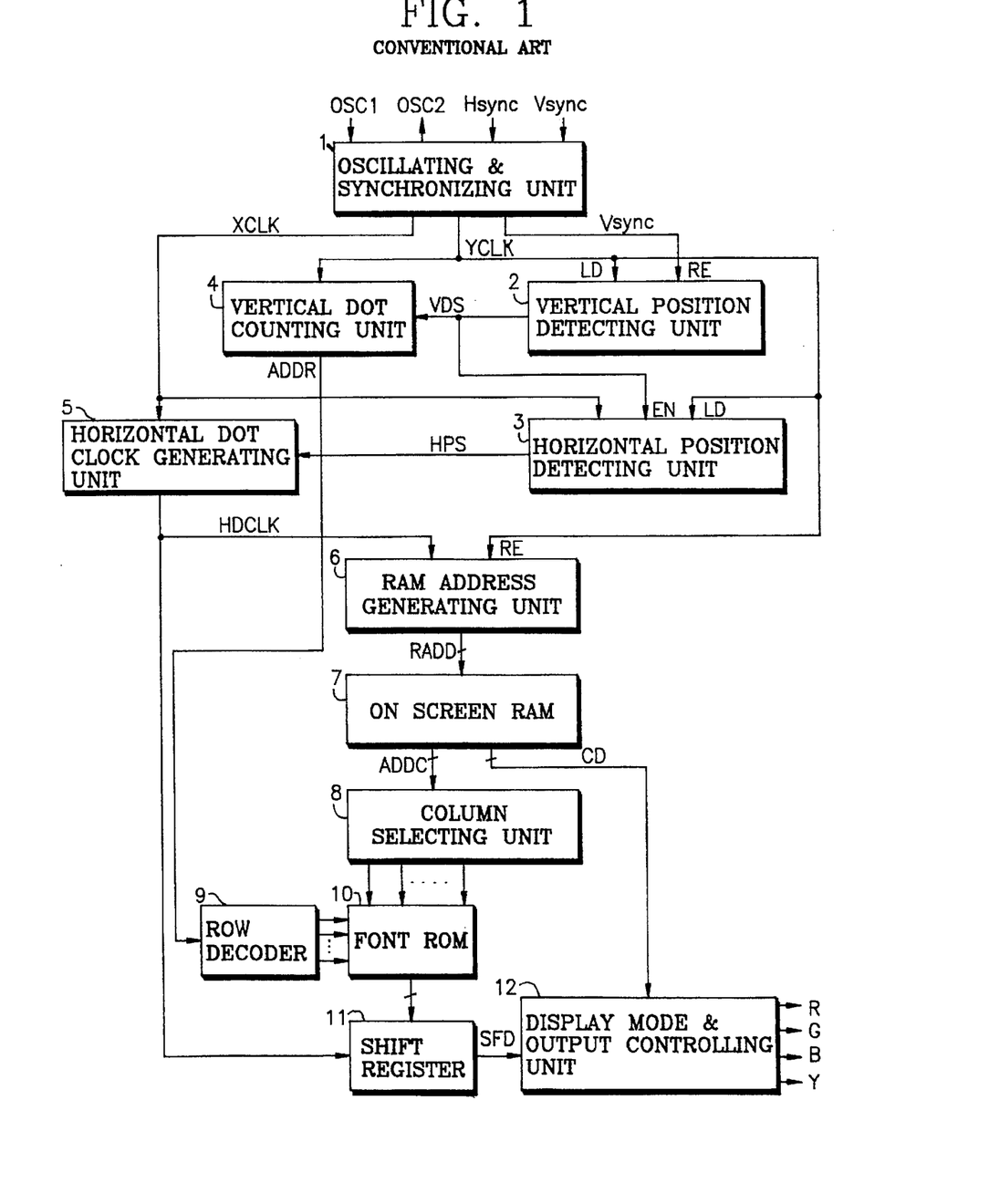
FIG. 1 is a block diagram illustrating a construction of a conventional OSD circuit.

Referring to FIG. 1, there is shown a block diagram of a conventional on-screen display (referred to hereinafter as OSD) circuit. As shown in this drawing, the conventional OSD circuit comprises an oscillation control/synchronization circuit 1 for generating a vertical clock signal YCLK in response to a horizontal synchronous signal Hsync and a horizontal clock signal XCLK in response to a reference clock signal OSC. The vertical and horizontal clock signals YCLK and XCLK from the oscillation control/synchronization circuit 1 designate vertical and horizontal positions on a screen, respectively. Also, the oscillation control/synchronization circuit 1 inputs a vertical synchronous signal Vsync and outputs the inputted vertical synchronous signal Vsync.

The conventional OSD circuit also comprises a vertical position detector 2 being reset in response to the vertical synchronous signal Vsync from the oscillation control/synchronization circuit 1 to count the vertical clock signal YCLK from the oscillation control/synchronization circuit 1 and generate a vertical position signal VDS in accordance with the counted result. The vertical position signal VDS from the vertical position detector 2 designates a vertical position of a character to be displayed on the screen.

Also, the conventional OSD circuit comprises a horizontal position detector 3 being enabled in response to the vertical position signal VDS from the vertical position detector 2 to count the horizontal clock signal XCLK from the oscillation control/synchronization circuit 1 and generate a horizontal position signal HPS in accordance with the counted result. The horizontal position signal HPS from the horizontal position detector 3 designates a horizontal position of the character to be displayed on the screen.

Further, the conventional OSD circuit comprises a vertical dot counter 4 being enabled in response to the vertical position signal VDS from the vertical position detector 2 to frequency-divide the vertical clock signal YCLK from the oscillation control/synchronization circuit 1 by a vertical size of the character to be displayed on the screen, count the frequency-divided vertical clock signal YCLK and generate a row address ADDR in accordance with the counted result, a horizontal dot clock generator 5 being enabled in response to the horizontal position signal HPS from the horizontal position detector 3 to frequency-divide the horizontal clock signal XCLK from the oscillation control/synchronization circuit 1 by a horizontal size of the character to be displayed on the screen and output the frequency-divided horizontal clock signal XCLK as a horizontal dot clock signal HDCLK, and a random access memory (referred to hereinafter as RAM) address generator 6 being reset in response to the vertical clock signal YCLK from the oscillation control/synchronization circuit 1 to frequency-divide the horizontal dot clock signal HDCLK from the horizontal dot clock generator 5 by the number of horizontal dots of one character, count the frequency-divided horizontal dot clock signal HDCLK and generate a read address RADD in accordance with the counted result.

Further, the conventional OSD circuit comprises an on-screen RAM 7 for outputting a character address ADDC and corresponding color data CD in its location corresponding to the read address RADD from the RAM address generator 6, a column selector 8 for determining a column address of the character to be displayed on the screen, in response to the character address ADDC from the on-screen RAM 7, a row decoder 9 for decoding the row address ADDR from the vertical dot counter 4, a font ROM 10 for outputting character data in its location corresponding to column and row addresses from the column selector 8 and the row decoder 9, a shift register 11 for converting the character data from the font ROM 10 into serial font data SFD synchronously with the horizontal dot clock signal HDCLK from the horizontal dot clock generator 5, and a display mode/output controller 12 for generating red (R), green (G) and blue (B) color signals and a switching signal Y according to a designated display mode in response to the serial font data SFD from the shift register 11 and the color data CD from the on-screen RAM 7.

The operation of the conventional OSD circuit with the above-mentioned construction will hereinafter be described.

First, in FIG. 1, the horizontal and vertical synchronous signals Hsync and Vsync are separated from a broadcasting signal and then applied to the oscillation control/synchronization circuit 1, which also inputs the reference clock signal OSC. The oscillation control/synchronization circuit 1 generates the vertical clock signal YCLK in response to the horizontal synchronous signal Hsync to designate the vertical position on the screen. Also, the oscillation control/synchronization circuit 1 generates the horizontal clock signal XCLK in response to the reference clock signal OSC to designate the horizontal position on the screen. Further, the oscillation control/synchronization circuit 1 inputs the vertical synchronous signal Vsync and outputs the inputted vertical synchronous signal Vsync to the vertical position detector 2. The horizontal clock signal XCLK from the oscillation control/synchronization circuit 1 is applied to the horizontal position detector 3 and the horizontal dot clock generator 5. The vertical clock signal YCLK from the oscillation control/synchronization circuit 1 is applied to the vertical position detector 2, the horizontal position detector 3, the vertical dot counter 4 and the RAM address generator 6. The vertical position detector 2 is reset in response to the vertical synchronous signal Vsync from the oscillation control/synchronization circuit 1 to count the vertical clock signal YCLK from the oscillation control/synchronization circuit 1. As a result of the counting, the vertical position detector 2 generates the vertical position signal VDS to designate the vertical position of the character to be displayed on the screen. The vertical position signal VDS from the vertical position detector 2 is applied to the horizontal position detector 3 and the vertical dot counter 4.

When the vertical position signal VDS from the vertical position detector 2 is made active, the vertical dot counter 4 is enabled. As being enabled, the vertical dot counter 4 frequency-divides the vertical clock signal YCLK from the oscillation control/synchronization circuit 1 by the vertical size of the character to be displayed on the screen and counts the frequency-divided vertical clock signal YCLK. As a result of the counting, the vertical dot counter 4 generate the row address ADDR of the font ROM 10 in accordance with the counted result. The row address ADDR from the vertical dot counter 4 is applied to the row decoder 9.

Figure 2:
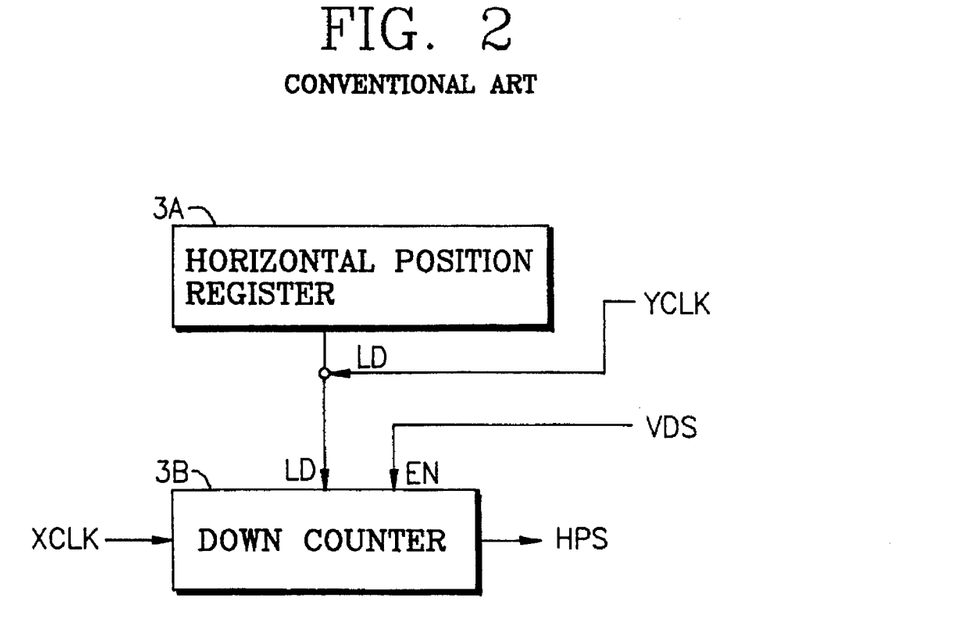
FIG. 2 is a detailed block diagram of a horizontal position detector in FIG. 1.

Referring to FIG. 2, there is shown a detailed block diagram of the horizontal position detector 3 in FIG. 1. As shown in this drawing, the horizontal position detector 3 includes a horizontal position register 3A for storing a horizontal position value of an OSD region, and a down counter 3B for down-counting the horizontal position value of the OSD region from the horizontal position register 3A in response to the horizontal clock signal XCLK from the oscillation control/synchronization circuit 1. As the vertical clock signal YCLK from the oscillation control/synchronization circuit 1 is applied, the horizontal position value of the OSD region stored in the horizontal position register 3A is loaded into the down counter 3B. The down counter 3B down-counts the loaded horizontal position value of the OSD region from the horizontal position register 3A in response to the horizontal clock signal XCLK from the oscillation control/synchronization circuit 1. Then, the down counter 3B generates the horizontal position signal HPS at the moment that its count reaches "0". In result, the horizontal position signal HPS from the down counter 3B indicates a start point of a horizontal display position of the OSD region. Heret the down counter 3B is enabled when the vertical position signal VDS from the vertical position detector 2 is made active. Then, the horizontal position signal HPS from the down counter 3B is applied to the horizontal dot clock generator 5 in FIG. 1.

Referring again to FIG. 1, the horizontal dot clock generator 5 is enabled when the horizontal position signal HPS from the horizontal position detector 3 is made active. As being enabled, the horizontal dot clock generator 5 frequency-divides the horizontal clock signal XCLK from the oscillation control/synchronization circuit 1 by the horizontal size of the character to be displayed on the screen and outputs the frequency-divided horizontal clock signal XCLK as the horizontal dot clock signal HDCLK to the RAM address generator 6 and the shift register 11.

Figure 3:
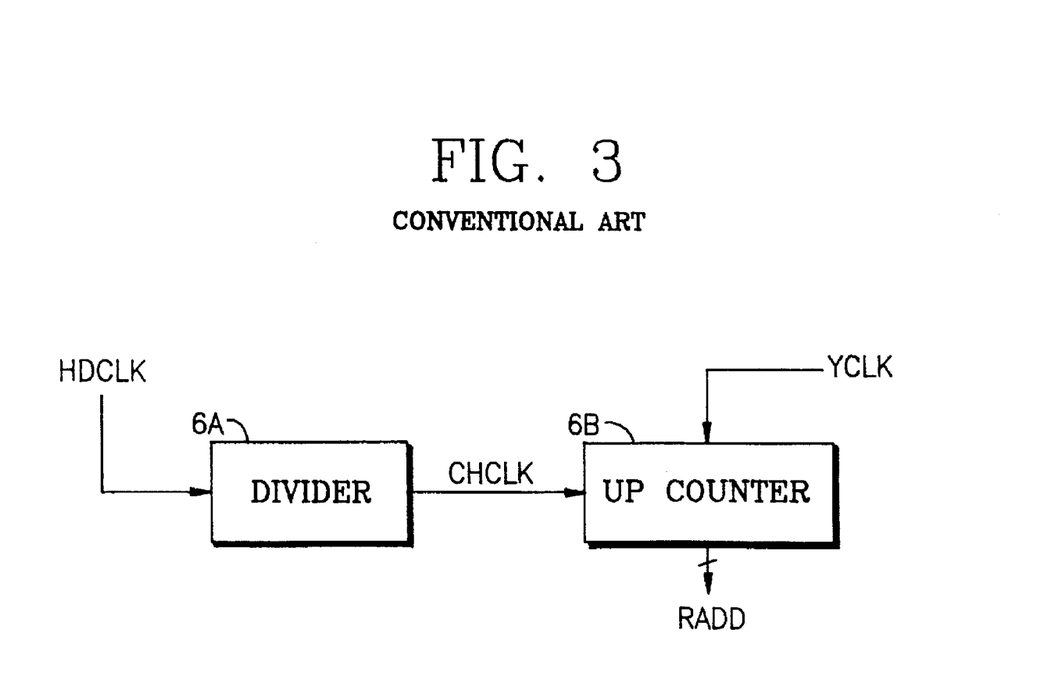
FIG. 3 is a detailed block diagram of a RAM address generator in FIG. 1.

Referring to FIG. 3, there is shown a detailed block diagram of the RAM address generator 6 in FIG. 1. As shown in this drawing, the RAM address generator 6 includes a frequency divider 6A for frequency-dividing the horizontal dot clock signal HDCLK from the horizontal dot clock generator 5 by the number of the horizontal dots of one character and outputting the frequency-divided horizontal dot clock signal HDCLK as a character clock signal CHCLK at an interval of character, and an up-counter 6B for up-counting the character clock signal CHCLK from the, frequency divider 6A and generating the read address RADD of the on-screen RAM in accordance with the counted result. Here, the up-counter 6B is reset in response to the vertical clock signal YCLK from the oscillation control/synchronization circuit 1. The read address RADD from the up-counter 6B is applied to the on-screen RAM 7.

Referring again to FIG. 1, the on-screen RAM 7 stores the character addresses ADDC and the corresponding color data CD. Upon receiving the read address RADD from the RAM address generator 6, the on-screen RAM 7 outputs the character address ADDC and the corresponding color data CD in its location corresponding to the received read address RADD. The character address ADDC from the on-screen RAM 7 is applied to the column selector 8 and the color data CD therefrom is applied to the display mode/output controller 12. The column selector 8 designates the column address of the font ROM 10 in response to the character address ADDC from the on-screen RAM 7. The row decoder 9 decodes the row address ADDR from the vertical dot counter 4 and outputs the decoded signal to the font ROM 10 to designate the row address thereof.

The font ROM stores the character font data in the form of code. Upon receiving the column and row addresses from the column selector 8 and the row decoder 9, the font ROM 10 outputs the character data in its location corresponding to the received column and row addresses. The character data from the font ROM 10 is loaded into the shift register 11. The shift register 11 converts the loaded character data from the font ROM 10 into the serial font data SFD using the horizontal dot clock signal HDCLK from the horizontal dot clock generator 5 as a shift clock. The serial font data SFD from the shift register 11 is applied to the display mode/output controller 12. Using the serial font data SFD from the shift register 11 and the color data CD from the on-screen RAM 7, the display mode/output controller 12 generates the R, G and B color signals and the switching signal Y according to the designated display mode. The switching signal Y from the display mode/output controller 12 acts to block a broadcasting signal corresponding to the OSD region so that it cannot be displayed on the screen.

However, in the above-mentioned conventional OSD circuit, a large amount of information is displayed as a plurality of lines on the screen in a multi-line manner. In this case, an original picture is not seen well on the screen because the OSD signal possesses a large portion of the screen.

SUMMARY OF THE INVENTION

Therefore, the present invention has been made in view of the above problem, and it is an object of the present invention to provide an OSD circuit for displaying effectively a large amount of information on a small area of a screen.

In accordance with the present invention, the above and other objects can be accomplished by a provision of an on-screen display circuit comprising moving clock generation means for generating a moving clock signal and a character moving clock signal in response to a vertical synchronous signal, said moving clock signal varying a horizontal display position value, said character moving clock signal indicating that information to be displayed on a screen has been moved by a horizontal width of one character; horizontal position detection means for generating a horizontal position signal in response to the moving clock signal and the character moving clock signal from said moving clock generation means, a vertical position signal and vertical and horizontal clock signals and outputting the generated horizontal position signal to a horizontal dot clock generator, said horizontal position signal designating a horizontal position of a character to be displayed on the screen; display off signal generation means for generating a display off signal in response to the vertical and horizontal clock signals and outputting the generated display off signal in such a manner that a series of characters being displayed can disappear successively at a desired position on the screen; and random access memory address generation means for generating a read address in response to the character moving clock signal from said moving clock generation means, the vertical clock signal and a horizontal dot clock signal from said horizontal dot clock generator so that the character to be displayed can appear on the screen, being moved to the desired position.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 4:
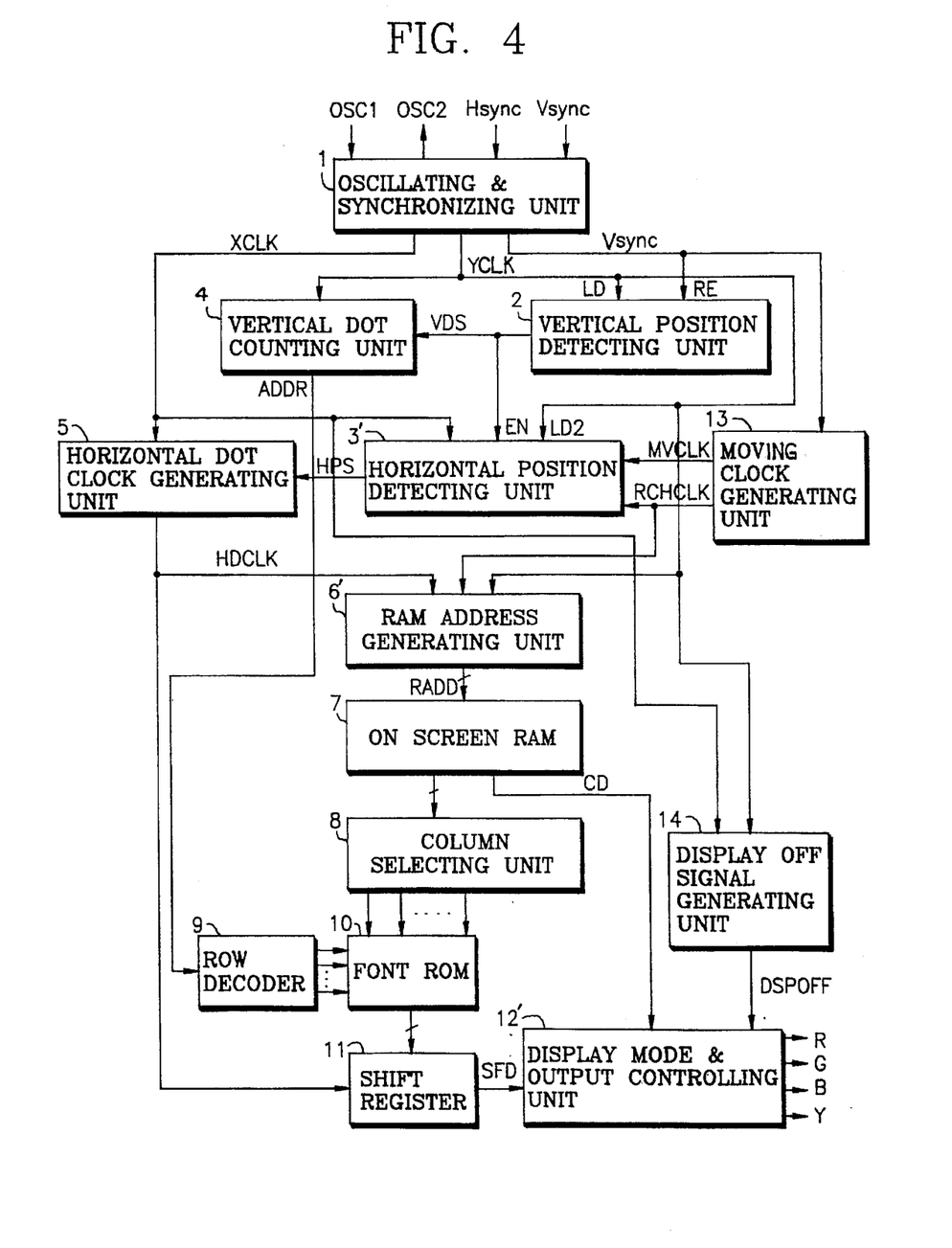
FIG. 4 is a block diagram illustrating a construction of an OSD circuit in accordance with the present invention.

Referring to FIG. 4, there is shown a block diagram of an OSD circuit in accordance with the present invention. The construction of this drawing is substantially the same as that of FIG. 1, with the exception that a moving clock generator 13 and a display off signal generator 14 are provided in addition to the construction of FIG. 1 and a horizontal position detector 3', a RAM address generator 6' and a display mode/output controller 12' are provided instead of the horizontal position detector 3, the RAM address generator 6 and the display mode/output controller 12 in FIG. 1, respectively. The moving clock generator 13 is adapted to generate a moving clock signal MVCLK and a character moving clock signal RCHCLK in response to the vertical synchronous signal Vsync from the oscillation control/synchronization circuit 1. The moving clock signal MVCLK from the moving clock generator 13 is used to vary a horizontal display position value. The character moving clock signal RCHCLK from the moving clock generator 13 is used to vary a RAM address value of the RAM address generator 6'. The display off signal generator 14 is adapted to generate a display off signal DSPOFF in response to the vertical and horizontal clock signals YCLK and XCLK from the oscillation control/synchronization circuit 1. The horizontal position detector 3' is adapted to input the moving clock signal MVCLK and the character moving clock signal RCHCLK from the moving clock generator 13 in addition to the signals in FIG. 1. The RAM address generator 6' is adapted to input the character moving clock signal RCHCLK from the moving clock generator 13 in addition to the signals in FIG. 1. The display mode/output controller 12' is adapted to input the display off signal DSPOFF from the display off signal generator 14 in addition to the signals in FIG. 1.

The operation of the OSD circuit with the above-mentioned construction in accordance with the present invention will hereinafter be described in detail with reference to FIGS. 4 to 8.

Figure 5:
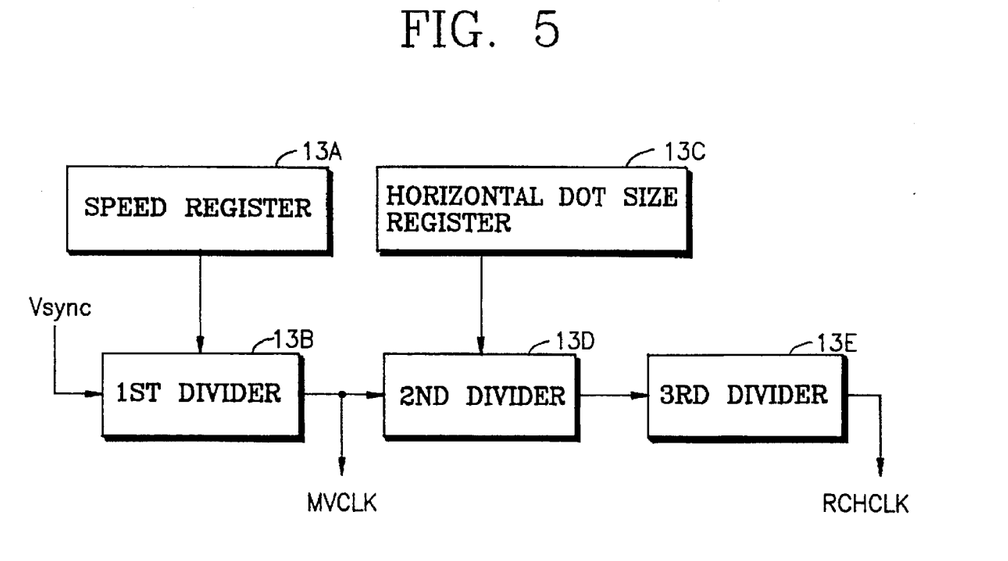
FIG. 5 is a detailed block diagram of a moving clock generator in FIG. 4.

FIG. 5 is a detailed block diagram of the moving clock generator 13 in FIG. 4. As shown in this drawing, the moving clock generator 13 includes a speed register 13A for storing a picture moving speed value, and a horizontal dot size register 13c for storing a horizontal dot size value. Further, the moving clock generator 13 includes three frequency dividers 13B, 13D and 13E. The first frequency divider 13B frequency-divides the vertical synchronous signal Vsync from the oscillation control/synchronization circuit 1 by the picture moving speed value from the speed register 13A and outputs the frequency-divided vertical synchronous signal Vsync as the moving clock signal MVCLK to the second frequency divider 13D and the horizontal position detector 3'. The moving clock signal MVCLK from the first frequency divider 13B is used to vary the horizontal display position value of the character to be displayed on the screen. Namely, the moving clock signal MVCLK from the first frequency divider 13B is used to move appropriately the character from the right to the left.

The second frequency divider 13D frequency-divides the moving clock signal MVCLK from the first frequency divider 13B by the horizontal dot size value from the horizontal dot size register 13c and outputs the resultant signal to the third frequency divider 13E. The third frequency divider 13E frequency-divides the output signal from the second frequency divider 13D by the number of the horizontal dots of one character and outputs the resultant signal as the character moving clock signal RCHCLK to the horizontal position detector 3' and the RAM address generator 6'. The character moving clock signal RCHCLK from the third frequency divider 13E indicates that a character string to be displayed on the screen has been moved by a horizontal width of one character.

Figure 6:
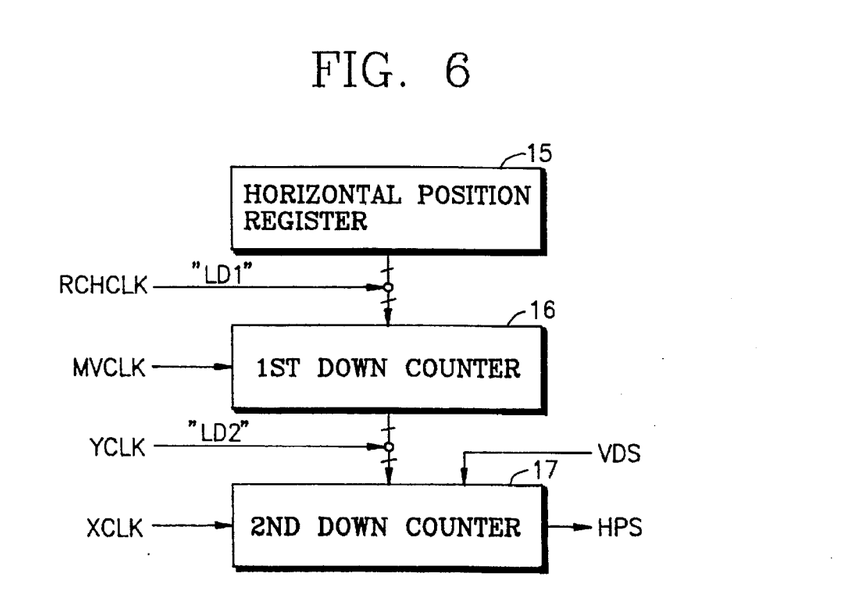
FIG. 6 is a detailed block diagram of a horizontal position detector in FIG. 4.

FIG. 6 is a detailed block diagram of the horizontal position detector 3' in FIG. 4. As shown in this drawing, the horizontal position detector 3' includes a horizontal position register 15 for storing the horizontal display position value of the character to be displayed on the screen, and two down counters 16 and 17. When the character moving clock signal RCHCLK from the moving clock generator 13 is made active, the horizontal display position value stored in the horizontal position register 15 is loaded into the first down counter 16. The first down counter 16 down-counts the loaded horizontal display position value from the horizontal position register 15 in response to the moving clock signal MVCLK from the moving clock generator 13. Then, if the vertical clock signal YCLK from the oscillation control/synchronization circuit 1 is made active, an output signal from the first down counter 16 is loaded into the second down counter 17. When, the vertical position signal VDS from the vertical position detector 2 is made active, the second down counter 17 down-counts the loaded signal from the first down counter 16 in response to the horizontal clock signal XCLK from the oscillation control/synchronization circuit 1o Then, the second down counter 17 generates the horizontal position signal HPS at the moment that its count reaches "0". In result, the horizontal position signal HPS from the second down counter 17 indicates a start point of the horizontal display position of the OSD region. Then, the horizontal position signal HPS from the second down counter 17 is applied to the horizontal dot clock generator 5 in. FIG. 4.

Figure 7:
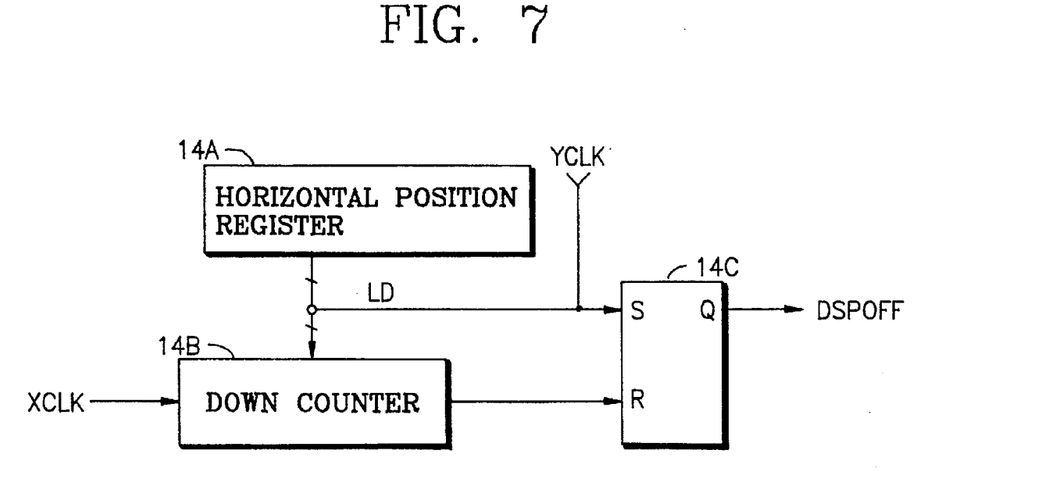
FIG. 7 is a detailed block diagram of a display off signal generator in FIG. 4.

FIG. 7 is a detailed block diagram of the display off signal generator 14 in FIG. 4. The display off signal generator 14 is adapted to generate the display off signal DSPOFF in response to the vertical and horizontal clock signals YCLK and XCLK from the oscillation control/synchronization circuit 1 to disable the R, G and B color signals and the switching signal Y from the display mode/output controller 12'. To this end, the display off signal generator 14 includes a horizontal position register 14A for storing the horizontal display position value of the character to be displayed on the screen, a down counter 14B and an RS flip-flop 14C. When the vertical clock signal YCLK from the oscillation control/synchronization circuit 1 is made active, the horizontal display position value stored in the horizontal position register 14A is loaded into the down counter 14B. The down counter 14B down-counts the loaded horizontal display position value from the horizontal position register 14A in response to the horizontal clock signal XCLK from the oscillation control/synchronization circuit 1. Then, the down counter 14B outputs a reset signal to the RS flip-flop 14C at the moment that its count reaches "0". As a result, the display off signal DSPOFF or an output signal from the RS flip-flop 14C is reset. Thereafter, when the vertical clock signal YCLK from the oscillation control/synchronization circuit 1 is again made active, the output signal DSPOFF from the RS flip-flop 14C is set. In result, the display off signal DSPOFF from the RS flip-flop 14C is outputted in such a manner that the characters moving from the right to the left 5 can disappear successively at a desired position on the screen. Then, the display off signal DSPOFF from the RS flip-flop 14C is applied to the display mode/output controller 12'.

Figure 8:
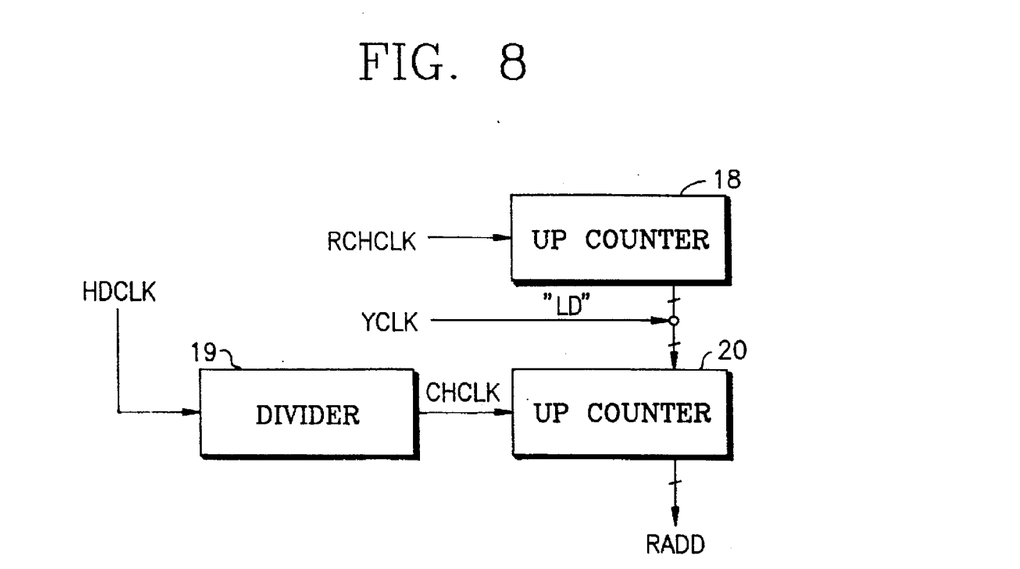
FIG. 8 is a detailed block diagram of a RAM address generator in FIG. 4.

FIG. 8 is a detailed block diagram of the RAM address generator 6' in FIG. 4. As shown in this drawing, the RAM address generator 6' includes two up counters 18 and 20 and a frequency divider 19. The first up counter 18 up-counts the character moving clock signal RCHCLK from the moving clock generator 13. At this time, if the vertical clock signal YCLK from the oscillation control/synchronization circuit 1 is made active, an output signal from the first up counter 18 is loaded into the second up counter 20. The frequency divider 19 frequency-divides the horizontal dot clock signal HDCLK from the horizontal dot clock generator 5 by the number of the horizontal dots of one character and outputs the frequency-divided horizontal dot clock signal HDCLK as the character clock signal CHCLK to the second up counter 20. Then, the second up-counter 20 up-counts the loaded signal from the first up counter 18 in response to the character clock signal CHCLK from the frequency divider 19 and generates the read address RADD of the on-screen RAM in accordance with the counted result. The read address RADD from the second up-counter 20 is applied to the on-screen RAM 7.

Referring again to FIG. 4, the display mode/output controller 12' generates the R, G and B color signals and the switching signal Y according to the designated display mode in response to the serial font data SFD from the shift register 11 and the color data CD from the on-screen RAM 7. At this time, if the display off signal DSPOFF from the display off signal generator 14 is made active, the display mode/output controller 12' disables the R, G and B color signals and the switching signal Y.

As apparent from the above description, according to the present invention, the OSD circuit can display the characters or pictures successively like motion captions using the moving clock generator and the display off signal generator. Therefore, the OSD circuit of the present invention has the effect of displaying a larger amount of information on a small area of the screen to indicate effectively help and error messages.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An on-screen display circuit comprising:

moving clock generation means for generating a moving clock signal and a character moving clock signal in response to a vertical synchronous signal, said moving clock signal varying a horizontal display position value, said character moving clock signal indicating that information to be displayed on a screen has been moved by a horizontal width of one character;

horizontal position detection means for generating a horizontal position signal in response to the moving clock signal and the character moving clock signal from said moving clock generation means, a vertical position signal and vertical and horizontal clock signals and outputting the generated horizontal position signal to a horizontal dot clock generator, said horizontal position signal designating a horizontal position of a character to be displayed on the screen;

display off signal generation means for generating a display off signal in response to the vertical and horizontal clock signals and outputting the generated display off signal in such a manner that a series of characters being displayed can disappear successively at a desired position on the screen; and random access memory address generation means for generating a read address in response to the character moving clock signal from said moving clock generation means, the vertical clock signal and a horizontal dot clock signal from said horizontal dot clock generator so that the character to be displayed can appear on the screen, being moved to the desired position.

2. An on-screen display circuit as set forth in claim 1, wherein said moving clock generation means includes:

a first frequency divider for frequency-dividing the vertical synchronous signal by a picture moving speed value and outputting the frequency-divided vertical synchronous signal as the moving clock signal to said horizontal position detection means;

a second frequency divider for frequency-dividing the moving clock signal from said first frequency divider by a horizontal dot size value of the information to be displayed on the screen; and a third frequency divider for frequency-dividing an output signal from said second frequency divider by the number of horizontal dots of one character and outputting the resultant signal as the character moving clock signal to said horizontal position detection means and said random access memory address generation means.

3. An on-screen display circuit as set forth in claim 1, wherein said horizontal position detection means includes:

a first down counter for loading the horizontal display position value therein when the character moving clock signal 5 from said moving clock generation means is made active and down-counting the loaded horizontal display position value in response to the moving clock signal from said moving clock generation means; and a second down counter for loading an output signal from said first down counter therein when the vertical clock signal is made active, said second down counter being enabled in response to the vertical position signal to down-count the loaded signal from said first down counter in response to the horizontal clock signal and outputting the resultant signal as the horizontal position signal to the horizontal dot clock generator.

4. An on-screen display circuit as set forth in claim 1, wherein said display off signal generation means includes:

a down counter for loading the horizontal display position value therein in response to the vertical clock signal and down-counting the loaded horizontal display position value in response to the horizontal clock signal; and an RS flip-flop being reset in response to an output signal from said down counter and set in response to the vertical clock signal to output the display off signal.

5. An on-screen display circuit as set forth in claim 1, wherein said random access memory address generation means includes:

a first up counter for up-counting the character moving clock signal from said moving clock generation means;

a frequency divider for frequency-dividing the horizontal dot clock signal from said horizontal dot clock generator by the number of horizontal dots of one character and outputting the frequency-divided horizontal dot clock signal as a character clock signal; and a second up-counter for loading an output signal from said first up counter in response to the vertical clock signal, up-counting the loaded signal from said first up counter in response to the character clock signal from said frequency divider and outputting the resultant signal as the read address to a font read only memory storing character font data.

* * * * *